United States Patent

Bockstahler et al.

[15] 3,705,190

[45] Dec. 5, 1972

[54] PREVENTION OF POLYMER FOULING OF MONOMER PROCESSING APPARATUS

[72] Inventors: Theodore E. Bockstahler; Curtis R. Hunt, both of Houston, Tex.

[73] Assignee: Rohm and Haas Company, Philadelphia, Pa.

[22] Filed: March 17, 1969

[21] Appl. No.: 807,958

[52] U.S. Cl............260/486 R, 260/94.9 P, 260/96 R
[51] Int. Cl.............................................C07c 69/54
[58] Field of Search ..260/486 NC, 486, 94.9 P, 96 R

[56] References Cited

FOREIGN PATENTS OR APPLICATIONS 942,318  11/1963  Great Britain..............260/486

Primary Examiner—Lorraine A. Weinberger
Assistant Examiner—Paul Killos
Attorney—Robert A. Doherty and Carl A. Castellan

[57] ABSTRACT

Solvents for polymer formed during the preparation of ethylenically unsaturated monomers are introduced into processing zones for the monomer without interfering with said processing. Neutral oil, a fraction of coal tar low in phenolic content and having a large proportion of methyl naphthalenes with smaller amounts of mononuclear and polynuclear aromatic hydrocarbons and phenolic compounds, is particularly preferred as the solvent.

8 Claims, No Drawings

PREVENTION OF POLYMER FOULING OF MONOMER PROCESSING APPARATUS

This invention relates to improvements in the control of polymer formation and the removal of polymer during preparation of a polymerizable monomer.

It is well known to employ polymerization inhibitors to control polymer formation in the preparation and distillation of polymerizable unsaturated monomers. However, such inhibitors are not completely effective in eliminating polymer formation and therefore polymer accumulation tends to obstruct the flow of reactants or products through the apparatus and may cause fouling and plugging in the distillation tower and elsewhere. The undesired polymerization may take the form of a solid or semi-solid gum like polymer or an opaque cross linked polymer generally referred to as "popcorn polymer."

The latter is insoluble and the only recourse is physical removal from the apparatus. The other type of polymer is soluble in organic solvents but this is not much help when the apparatus, such as a distillation column tray, is plugged.

The standard method of attacking this problem is to feed antioxidants or polymerization inhibitors to the various processing zones in a manner similar to that shown in Jilk U.S. Pat. No. 2,416,756. Suitable inhibitors are disclosed in Craig U.S. Pat. No. 2,338,041, Thompson U.S. Pat. No. 2,887,369, Woods et al U.S. Pat. No. 2,351,384, and Hearne et al U.S. Pat. No. 2,887,498. Other inhibitor oils from the destructive distillation of wood, predominantly cresylic acid or phenolic wood tar oils have also been used as polymerization inhibitors.

It is an object of the invention to suppress the formation of gum-like polymer and to purge the monomer processing apparatus of existing gum polymer and similar polymer formations or accumulations, and to continuously or intermittently remove such gum polymer as it is formed, particularly while the monomer is being made and processed.

The invention is applicable to any polymerizable ethylenically unsaturated monomer which is subject to undesired polymerizaton during processing. Representative monomers to which the invention is particularly applicable are acrylic and meth-acrylic esters such as methyl acrylate, methyl methacrylate, butyl acrylate, butyl methacrylate, isobutyl acrylate, isobutyl methacrylate, pentadecyl acylate, pentadecyl methacrylate, amino acrylates such as dimethylaminoethyl methacrylate and t-butyl-aminoethyl methacrylate, and acrylic and methacrylic acids, or other acrylic acids or monomers. It will be noted that the alcohols forming the esters have from one to 15 carbon atoms. The invention is useful with any other ethylenically unsaturated monomer which presents the problem of gum polymer formation during processing.

The invention is based on the discovery that solvents for the gum-like polymer, particularly certain liquid mono- and polynuclear aromatic hydrocarbons, are capable of functioning as a solvent and will dissolve or flush accumulated gum polymer from the processing apparatus or prevent its accumulation, without interfering with monomer processing in the processing zones. Preferred polynuclear aromatic hydrocarbons are the alkyl naphthalenes such as the methyl naphthalenes ($\alpha$-methyl naphthalene and $\beta$-methyl naphthalene), naphthalene, and the ethyl naphthalenes ($\alpha$-ethyl naphthalene and $\beta$-ethyl naphthalene). Coal tar distillates containing a substantial fraction of naphthalene and alkyl naphthalenes are also useful as additives to the processing apparatus. Generally coal tar distillates having a low phenolic content (frequently referred to as neutral oils) having an initial boiling point of at least 170° C. and a 50 percent boiling point of at least 200° C. are particularly useful.

The use of neutral oil permits much longer periods of time on stream, giving a substantially greater production of product per given time period than in the same apparatus without the use of the invention. While the neutral oil is believed to serve primarily as a solvent for the gum type of polymer, it is also possible that the relatively small amounts of phenolic compounds serve as polymerization inhibitors. It has been noted that polymer deposits which were present prior to the use of the solvent neutral oil are rapidly removed thereby. It is not intended that the invention be limited by any such theories or hypotheses as are presented herein.

The solvent must be a liquid under the processing conditions utilized, e.g. at 0°–10° C. and at 100°–250° C. It is inert with respect to the monomers under the processing conditions used, and in connection with processing steps in which the monomer is in contact with aqueous media (e.g. wash towers) it must not lead to the formation of an emulsion, and it is of course water insoluble. As to the solubility characteristics, at least about fifteen parts of the polymer should be soluble in 100 parts of the solvent, by weight. It must be separable from the monomer as by distillation or by the addition of a precipitant liquid.

The preferred solvent liquids are coal tar neutral oils (i.e., low in tar acids or phenolic types of compounds) suitably obtained from coil tar light oil, middle oil, and heavy oil or a combination thereof (see Condensed Chemical Dictionary, Rose and Rose, 1968 printing pages 234–5). Similar products are obtained from low phenol "coal tar creosote" and blast furnace producer gas tar oil. While more expensive, relatively pure solvents are useful, examples being high boiling petroleum naphtha (b.p. 130°–195° C., 70–82 percent aromatics), $\alpha$- and $\beta$-methyl naphthalenes, phorone, toluene, the xylenes, high solvency petroleum hydrocarbons (b.p. 150°–190° C., about 95 percent aromatics), decahydronaphthalene, tetrahydronaphthalene, naphthalene and so on, the crude mixture in the form of neutral oil is preferred. Typical neutral oils contain 20–70 percent $\alpha$- and $\beta$-methylnapthalene, 2–25 percent naphthalene, up to 15 percent phenolics such as the cresols, xylenols, naphthols, and phenol, but preferably less than 10 percent thereof, with small amounts of ethyl benzene, cumene, the xylenes, fluorene, biphenyl, phenanthrene and related unidentified materials, The neutral oils are also useful for cleaning shut down apparatus fouled with polymer.

By way of example, Allied Chemical neutral oil or Koppers 0° C. Crystal Free Neutral oil are intermittently or continuously charged to the processing apparatus either together with any known polymerization inhibitors or charged separately. As is suggested above, the Jilk U.S. Pat. No. 2,416,756 shows suitable points for feeding the oil and inhibitor, for example, in the esterification reactor wherein methanol is reacted with the reaction product of acetone cyanohydrin and sulfuric acid to give methyl methacrylate. The solvent is suitably added during processing of the monomer at any point where polymerization inhibitor is introduced. Such suitable points are also shown in the published description, of a typical commercial plant for making acrylates and methacrylates of $C_1$—$C_{20}$ alkanols, appearing in Ind. and Engrg. Chem., Vol. 51, pp. 1232–1238 and 1328–1334, Oct. and Nov. 1959, which description is incorporated herein by reference as being helpful to, but not essential to, an understanding of the invention. Taking for example the preparation of methyl methacrylate, the polymer solvent (and inhibitor) are fed to the esterification kettle, the acid stripping column, the rectifier column, each distillation column, and even into conduits conveying monomer from one place to another. The liquid aromatic hydrocarbon may be employed in the monomer processing zone in the absence of monomer solely to purge and flush any pre-existing gum polymer from the apparatus. In this manner the aromatic polynuclear hydrocarbon acts to cleanse the system.

Known polymerization inhibitors include the phenolic type of compounds such as t-butyl catechol and hydroquinone, amino type compounds such as phenyl-$\beta$-napthylamine and sulfur containing compounds such as phenothiazine.

The liquid polynuclear aromatic hydrocarbon may be added as a spray or by other means to the processing apparatus in an amount sufficient to prevent excessive gum polymer accumulation. The presence of such polymer and amounts thereof are readily ascertained by conventional means such as sight glasses at trouble spots, analysis of distillation column bottoms and the like. Suitable amounts of solvent such as neutral oil or other materials such as those containing a predominant amount of aromatic hydrocarbons are between about 0.5 percent and 10 percent based on the weight of monomer produced or being processed in a given processing zone. Excess neutral oil or other solvent does no harm; it simply reduces processing capacity and involves more expense in separating the monomer and solvent and in purifying the two. Since they are miscible, the two pass together in the organic liquid phase through zones wherein an aqueous phase is present at temperatures where both are liquids. In zones where monomer is distilled in one or more columns, the solvent is separated from the monomer and new solvent and inhibitor are added at the next zone.

Example 1

Neutral oil and polymerization inhibitor dissolved therein are fed into the top of a distillation column and crude methyl methacrylate at the inlet thereof. The neutral oil flows down through the column, keeping the surface wet therewith and free of polymer.

Example 2

The reaction product of acetone cyanohydrin and 100 percent sulfuric acid is continuously added to a continuous reactor with aqueous methanol and a polymerization inhibitor in accordance with conventional procedure. Also introduced continuously is a spray of neutral oil (Koppers) having less than 2 percent tar acids and 4 percent unsulfonated residue, with fractions of 5 percent boiling at 180° C., 50 percent boiling at 232° C. and 90 percent boiling at 248° C., all at atmospheric pressure, the amount of neutral oil being about 5 percent of the combined weight of the solvent and the methyl methacrylate produced. The reactor contents, held at reflux temperature are removed at a rate to give a residence time of about two hours.

Example 3

A distillation column having a coating of gum polymer of methyl methacrylate on the interior surfaces thereof is cleansed with neutral oil (Allied) containing about 55 percent $\beta$-methylnaphthalene, 15 percent $\alpha$-methylnaphthalene, 11 percent naphthalene, 2 percent cresols, xylenes, and naphthols, with small amounts of related mononuclear and polynuclear aromatic hydrocarbons and phenolic compounds, heated to a temperature of about 200° C. The liquid is circulated through the column for about four hours, after which it is found that the polymeric coating is dissolved.

The analyses of neutral oil mentioned above are those obtained in terms of area percent by gas chromatography.

We claim:

1. In the preparation of an olefinically unsaturated monomer which forms a gum-type polymer during manufacture and processing thereof, the improvement of introducing an organic liquid, which liquid is a solvent for said gum-type polymer, into a processing zone in which said monomer is being prepared or processed while the monomer is being prepared and processed, said solvent being substantially inert to said monomer under the conditions encountered, and being liquid under the conditions used, in which said liquid consists essentially of at least one aromatic hydrocarbon in an amount of at least 0.5 percent by weight of the monomer being produced or processed.

2. The process of claim 1 in which said zone is a distillation zone.

3. The process of claim 1 in which said unsaturated monomer is an ester of an alcohol and said solvent is introduced into the esterification zone.

4. The process of claim 1 in which said zone is one in which said monomer is contacted with an aqueous medium.

5. The process of claim 1 in which said solvent consists essentially of aromatic petroleum hydrocarbons, or neutral oil aromatic hydrocarbons obtained from coal tar distillates, coal tar creosote, or blast furnace producer gas oil, low in acids and phenolic compounds, the amount of said hydrocarbon being at last 0.5 percent, based on the weight of the monomer being processed or produced.

6. The process of claim 2 in which said solvent consists essentially of aromatic petroleum hydrocarbons, or neutral oil aromatic hydrocarbons obtained from coal tar distillates, coal tar creosote, or blast furnace producer gas oil, low in acids and phenolic compounds, the amount of said hydrocarbon being at least 0.5 percent, based on the weight of the monomer being processed or produced.

7. The process of claim 3 in which said solvent consists essentially of aromatic petroleum hydrocarbons, or neutral oil aromatic hydrocarbons obtained from coal tar distillates, coal tar creosote, or blast furnace producer gas oil, low in acids and phenolic compounds, the amount of said hydrocarbon being at least 0.5 percent, based on the weight of the monomer being processed or produced.

8. The process of claim 4 in which said solvent consists essentially of aromatic petroleum hydrocarbons, or neutral oil aromatic hydrocarbons obtained from coal tar distillates, coal tar creosote, or blast furnace producer gas oil, low in acids and phenolic compounds, the amount of said hydrocarbon being at least 0.5 percent, based on the weight of the monomer being processed or produced.

* * * * *

UNITED STATES PATENT OFFICE
CERTIFICATE OF CORRECTION

Patent No. 3,705,190          Dated December 5, 1972

Inventor(s) Theodore E. Bockstahler, Curtis R. Hunt

It is certified that error appears in the above-identified patent and that said Letters Patent are hereby corrected as shown below:

Column 4, line 20 - "xylenes" should be --xylenols--

Signed and sealed this 16th day of April 1974.

(SEAL)
Attest:

EDWARD M. FLETCHER, JR.
Attesting Officer

C. MARSHALL DANN
Commissioner of Patents